Patented July 3, 1934

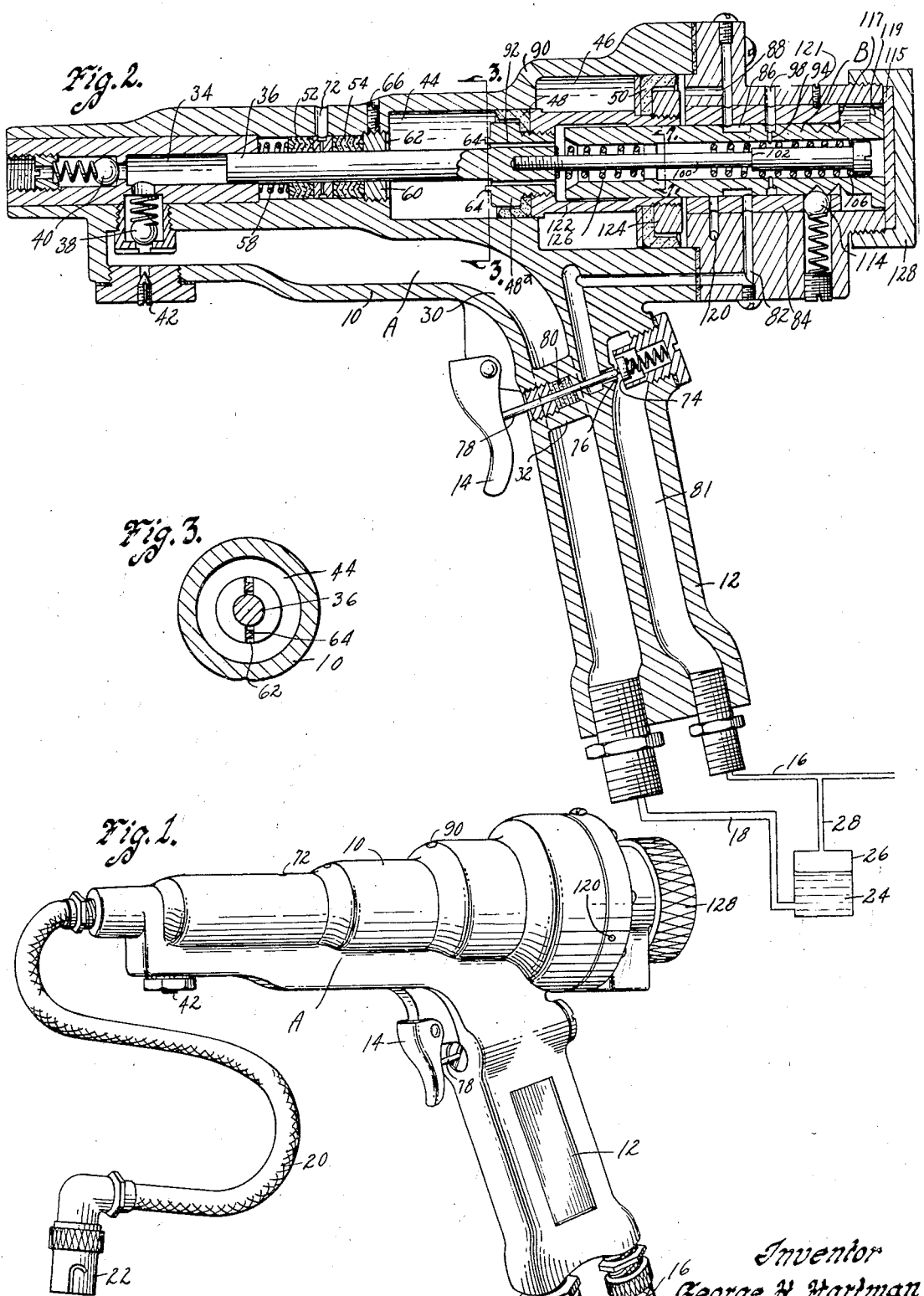

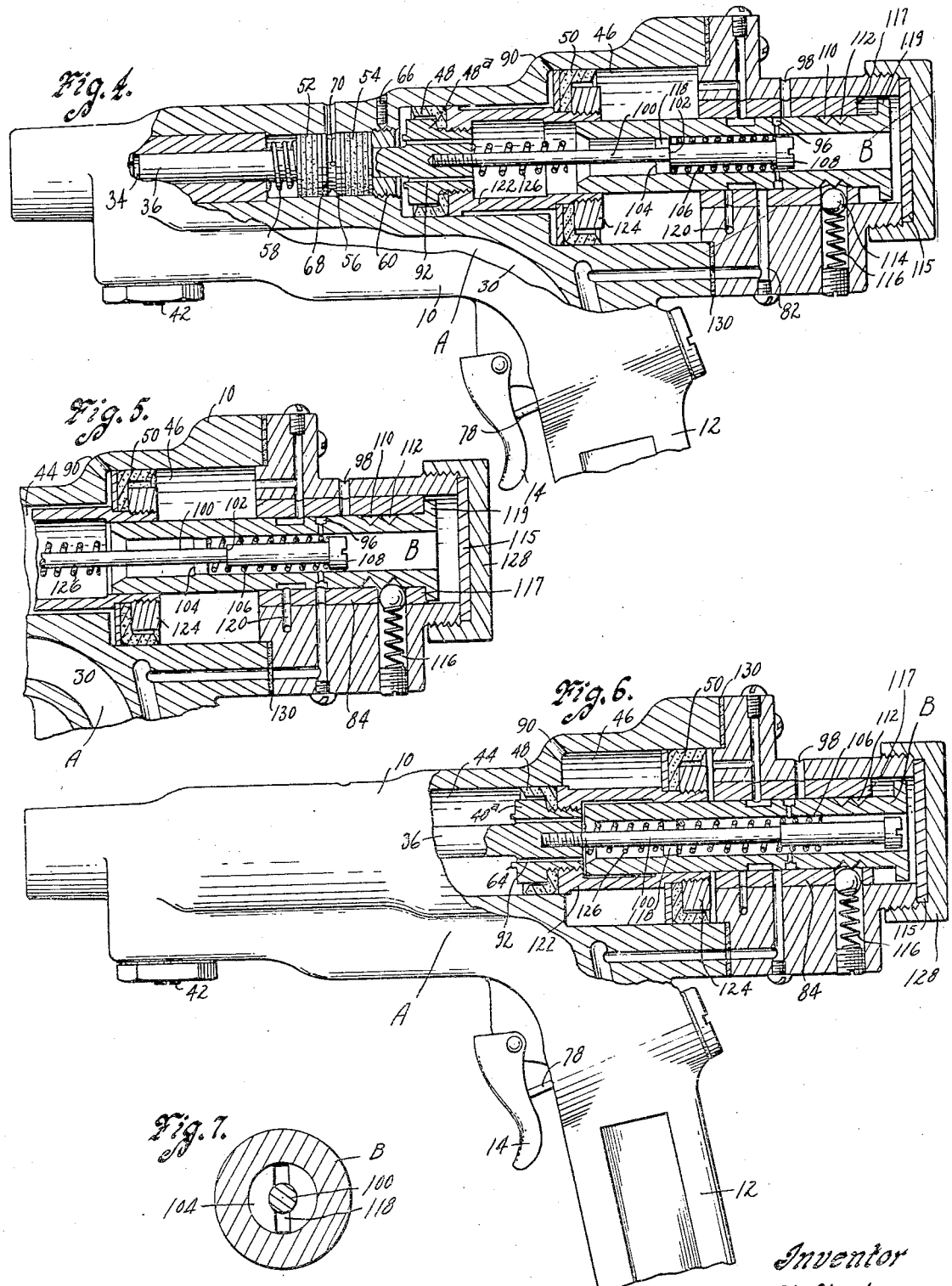

1,965,038

UNITED STATES PATENT OFFICE 1,965,038

FLUID MOTOR

George H. Hartman, Bryan, Ohio, assignor to The Aro Equipment Corporation, Bryan, Ohio, a corporation of Ohio Application September 2, 1931, Serial No. 560,860

6 Claims. (Cl. 121—164)

An object of my present invention is to provide a fluid motor of simple, durable and inexpensive construction in which compressed air is utilized for driving the power element of the motor (which is of the reciprocating type) in both directions.

A further object is to provide a lubricant pumping device comprising lubricant pumping mechanism and cylinder and piston means for actuating the same, a valve being provided for admitting compressed air to the cylinder and permitting exhaust of air therefrom, the valve being automatically operated by the piston as it moves in opposite directions.

Still a further object is to provide the piston in the form of actually two separate pistons interconnected for simultaneous movement and of different sizes, a cylinder being provided for each piston and the valve being arranged to control the flow of air to and from each cylinder.

A further object is to provide the valve mechanism in the form of a sliding valve with snap acting means for retaining it normally in either one of two positions, with means connected with the piston to start the movement of the valve from either of its two positions to the other position thereof and resilient means to act in conjuncture with the snap acting mechanism to complete such movement of the valve.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a perspective view of a lubricant pumping gun embodying my invention.

Figure 2 is an enlarged vertical sectional view through the same showing the parts in one position.

Figure 3 is a sectional view on the line 3—3 of Figure 2 showing a means for tightening a packing nut.

Figure 4 is a sectional view similar to Figure 2 showing the parts in another position.

Figures 5 and 6 are similar views showing the parts in still other positions; and Figure 7 is an enlarged sectional view on the line 7—7 of Figure 2.

On the accompanying drawings, I have used the reference character A to indicate my lubricant pumping gun, in general. Viewed externally it has a barrel 10, a handle 12 somewhat like a piston grip and a trigger-like control 14. It is adapted to have a compressed air hose 16 and a lubricant supply hose 18 connected therewith. It also has connected therewith a high pressure lubricant conduit 20 terminating in a connector fitting 22, as shown in Figure 1. As shown diagrammatically in Figure 2, lubricant 24 may be supplied from a storage tank 26 to the gun A through the hose 18. A compressed air connection 28 is shown for placing the contents of the storage tank 26 under pressure to force the lubricant to the gun.

The lubricant travels through a passageway 30 (which branches around a boss 32) to a lubricant pumping cylinder 34. The cylinder 34 together with a reciprocating plunger 36 and intake and exhaust check valves 38 and 40, respectively, constitute lubricant pumping mechanism for pumping lubricant from the passageway 30 to the fitting 22. An air release valve 42 is provided for releasing air from the hose 18 and passageway 30 when the lubricant 24 is initially supplied to the gun A.

For actuating the reciprocating plunger 36 of the grease pumping mechanism, I provide, in general, a pair of cylinders 44 and 46 having pistons 48 and 50 (reciprocable therein and connected with each other) and a valve B. The piston 48 is provided for retracting the plunger 36 whereupon the lubricant 24 under pressure of air from the pipe 28 is forced through the passageway 30 and the intake check valve 38 into the cylinder 34, it following the receiving plunger 36. The piston 50 is provided for expelling such lubricant from the cylinder 34 through the outlet check valve 40 and the connector fitting 22 to a bearing or the like.

Pressure on the piston 48 is required only to overcome frictional resistance of it and the piston 50 incident to a retraction of the piston assembly so that the plunger 36 can be pulled back to permit lubricant to enter through the valve 38 and follow the receding plunger. The piston 48 preferably has a smaller area than the piston 50 to effect economy of compressed air consumption, since it is desired to expel lubricant from the cylinder 34 at a high pressure, but only slight pressure is required to draw lubricant thereinto through the valve 38.

It is necessary to minimize the escape of lubricant from the cylinder 34 around the plunger 36 and likewise to minimize the escape of compressed air from the cylinder 44 around the plunger 36. For this purpose I provide packings 52 and 54 separated by a ring 56 and held in position by a common spring 58 and a packing nut 60. In assembling the packings 52, it is impossible to place them in the position required and then force the plunger 36 through them without distorting the packings and the packing nut 60 is inaccessible when the piston 48 is in the cylinder 44. I therefore provide slots 62 in the packing nut 60 and lugs 64 on a head 48a of the piston 48 which coact with the slots. It will be obvious that with the lugs and slots in engagement with each other, rotation of the piston will cause rotation of the packing nut so that it can be screwed and unscrewed, as desired. A set screw 66 is provided for retaining the packing nut in adjusted position.

The separating ring 56 is provided with an annular groove 68 and radial openings 70 (see Figure 4) which communicate with an opening 72. Thus any grease leaking past the packing 52 and air leaking past the packing 54 are conducted to atmosphere.

For admitting compressed air to the valve B from the hose 16, I provide a valve 74 (see Figure 2) which is normally spring pressed against a seat 76.

By means of a thrust pin 78 which passes through a packing 80 in the boss 32, the valve 74 may be moved to open position against the action of the spring by depressing the trigger 14. This admits air from a passageway 81 with which the hose 16 is connected to a passageway 82.

With the parts in the position shown in Figure 2, the passageway 82, after extending through a sleeve 84, communicates with an annular groove 86 in the valve B. The groove 86 communicates with a passageway 88 for admitting compressed air to the cylinder 46 behind the piston 50. This drives the piston 50 in a left hand direction, the air in the cylinder 46 ahead of the piston being displaced and conducted to atmosphere through an opening 90. The air in the cylinder 44 is displaced and conducted through passageways 92 in the piston head 48a to the interior of the valve B (which is tubular in construction) and then through passageways 94 and an annular groove 96 to an exhaust port 98 which communicates with atmosphere.

A valve rod 100 is connected with the piston head 48a and has a shoulder 102 which engages a partition 104 of the valve B at the forward end of the stroke of the pistons 48 and 50 and the plunger 36, as shown in Figure 4. This occurs after a slight compression of a spring 106 on the rod 100, one end of which is engaged by a head 108 of the rod.

The valve B is retained in either of its two positions by means of a snap acting mechanism comprising a pair of annular V grooves 110 and 112 with which a ball 114 pressed by a spring 116 engages and a pair of stops (a bumper plate 115 and an end of the sleeve 84 indicated at 117).

After the shoulder 102 engages the partition 104, the groove 110 is moved relative to the ball 114 to a substantially central position, as shown in Figure 4, whereupon as soon as the central position is passed, the spring 106 expands and causes the valve B to snap to its opposite position as shown in Figure 5.

In such position, the passageway 82 communicates with the annular passageway 96 so that compressed air is supplied through the tubular valve B (the partition 104 having notches 118 for the passage of air around the rod 100 through the partition) to the passageways 92 and the cylinder 44. This causes a retracting motion of the plunger 36 toward the right and the air displaced from the cylinder 46 behind the piston 50 is conducted to atmosphere through the passageway 88 and the annular passageway 86 which is now in communication with an exhaust passageway 120, as shown in Figure 5.

It will be noted that the interconnecting means of the pistons 48 and 50 is a tubular member 122, which screw-threadedly cooperates with the piston head 48a and is provided with a nut 124, whereby the pistons 48 and 50, which are of the cup leather type, are assembled relative to the plunger 36. It will be noted that the valve B extends into the tubular member 122 whereby to condense the over-all length of the gun.

On the return of the plunger 36, the inner socket-like bottom of the plunger 122 engages the left end of the valve B to move the valve from the left to the right hand position, as shown in Figure 6. In this figure, the valve has been moved slightly past center and a spring 126, which has just been compressed in a manner similar to the spring 106 when the valve is moved in an opposite direction, is now expanding for completing the movement of the valve to the right hand position. The notches 118 in the partition 104, besides providing for passage of air around the rod 100, allow free passage of air through the partition when the shoulder 102 abuts thereagainst so as not to pocket air inside of the tubular connector 122 and the valve B and thus interfere with movement of the valve from its right hand position to its left hand position by the springs 106 and 116.

The bumper plate 115 and the end 117 of the sleeve 84 coact with an annular flange 119 of the valve B to serve as a positive stop for the valve in its two positions, as shown in Figures 2 and 5. It will be noted that the ball 114 in these figures is seated and therefore the valve is resiliently held against the stops by the spring 116. To prevent movement of the sleeve 84, caused by intermittent impact of the flange 119 against the end 117 thereof, the sleeve 84 of the barrel 10 of the gun A may be shouldered, or a set screw 121 may be provided, the latter being shown on the drawings.

A cover 128 is provided for the rear end of the barrel 10 and when it is removed, the valve B and the rod 100 may be removed and disassembled from the plunger 36, respectively. A gasket is indicated at 130 which separates the barrels into two parts so that they can be disconnected, when desired, for the purpose of gaining access to the pistons 50 and 48 and the packings 52 and 54.

It will be obvious that I have provided a compactly arranged lubricant pumping device which can be readily embodied in the form of a grease gun and which automatically pumps lubricant at a high pressure whenever the trigger 14 is depressed. A snap acting valve is provided for automatically causing reciprocation of the pumping plunger. The piston 48 provides for the use of compressed air for the purpose of returning the piston 50 and drawing lubricant into the cylinder 34 through the valve 38. This takes the place of a spring usually provided for this purpose and for the same pressure produced, a smaller piston 50 can be used as there is no expenditure of compressed air for compressing such a spring. The piston 48, by being quite small, economizes on the use of compressed air for the return of the piston 50 after a lubricant expelling operation.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A fluid motor comprising a pair of interconnected pistons of different sizes, a cylinder for each piston, a head for one of said cylinders, a valve slidable in said pistons and in said head and movable to two different positions for admitting air past the valve to one of said cylinders and into and longitudinally through the valve itself to the other one alternately and for oppositely and alternately permitting the escape of air therefrom past and into and through the valve, said valve being operatively engaged by said pistons at the ends of their stroke for automatically starting the movement of the valve toward its two positions and resilient means to complete such movement.

2. A fluid motor comprising a pair of interconnected pistons, a cylinder for each piston, a head for one of said cylinders, a valve slidable in said pistons and in said head and movable to two different positions for admitting air past said valve to one of said cylinders and into and longitudinally through the valve itself to the other of said cylinders alternately and for oppositely and alternately permitting escape of air from the cylinders past and into and through the valve and means for shifting the valve at the ends of the strokes of the pistons.

3. A fluid motor comprising a pair of interconnected pistons, a cylinder for each piston, a head for one of said cylinders, a valve slidable in said pistons and in said head and being ported within said head, said valve being movable to two different positions for admitting air from said head past said valve to one of said cylinders and from said head and into and longitudinally through the valve itself to the other of said cylinders alternately and for oppositely and alternately permitting escape of air from the cylinders past and into and through the valve and from the head and means for shifting said valve at the ends of the strokes of said pistons.

4. A fluid motor comprising a reciprocable piston, a cylinder therefor, a head for one end of said cylinder, a valve slidable in said piston and in said head and movable to two different positions for admitting air from said head past said valve to behind said piston and into and longitudinally through the valve itself to in front of said piston alternately and for oppositely and alternately permitting escape of air from behind and from in front of said piston past and into and through said valve and means for shifting said valve at the ends of the strokes of said piston.

5. A fluid motor comprising a piston, a cylinder therefor, a head for one end of said cylinder, a valve slidable in said piston and in said head and being ported within said head, said valve being movable to two different positions for admitting air from said head past said valve to behind said piston and into and longitudinally through the valve itself to in front of said piston alternately and for oppositely and alternately permitting escape of air from behind and from in front of said piston past and into and through said valve and from said head and means for shifting said valve at the ends of the strokes of said piston.

6. A fluid motor comprising a reciprocable piston, a cylinder therefor, a head for one end of said cylinder, a valve slidable in said piston and in said head and movable to two different positions for admitting air past the valve to the cylinder behind said piston and into and longitudinally through the valve itself to the cylinder in front of the piston alternately and for oppositely and alternately permitting the escape of air from said cylinder behind and in front of said piston past and into and through said valve, said valve being operatively engaged by said piston at the ends of its strokes for automatically starting the movement of the valve toward its two positions and resilient means to complete such movement.

GEORGE H. HARTMAN.